United States Patent
Stephenson et al.

(10) Patent No.: US 10,144,185 B2
(45) Date of Patent: Dec. 4, 2018

(54) METHOD AND APPARATUS FOR HIGH-TEMPERATURE POST-CURING OF UV-CURED PHOTOPOLYMERS

(71) Applicant: THE BOEING COMPANY, Huntington Beach, CA (US)

(72) Inventors: Benjamin J. Stephenson, Seattle, WA (US); Scott K Frankenbery, Tacoma, WA (US); William H Ingram, Jr., Puyallup, WA (US); William S. Hollensteiner, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 271 days.

(21) Appl. No.: 14/676,398

(22) Filed: Apr. 1, 2015

(65) Prior Publication Data

US 2016/0288433 A1  Oct. 6, 2016

(51) Int. Cl.
| | | |
|---|---|---|
| *B29C 71/02* | (2006.01) | |
| *B29C 71/00* | (2006.01) | |
| *B29C 71/04* | (2006.01) | |
| *B29C 35/08* | (2006.01) | |
| *B29K 105/24* | (2006.01) | |
| *B33Y 40/00* | (2015.01) | |
| *B29C 64/20* | (2017.01) | |

(52) U.S. Cl.
CPC .......... *B29C 71/04* (2013.01); *B29C 35/0805* (2013.01); *B29C 71/02* (2013.01); *B29C 64/20* (2017.08); *B29C 2035/0827* (2013.01); *B29C 2791/005* (2013.01); *B29K 2105/243* (2013.01); *B33Y 40/00* (2014.12)

(58) Field of Classification Search
CPC ..... B29C 71/02; B29C 71/04; B29C 35/0805; B29C 71/0063
USPC ........................................................ 510/272
See application file for complete search history.

(56) References Cited

U.S. PATENT DOCUMENTS

| | | | | |
|---|---|---|---|---|
| 4,699,803 | A * | 10/1987 | Araps .................. | H01L 21/312 216/18 |
| 5,248,456 | A * | 9/1993 | Evans, Jr. ............. | B33Y 40/00 118/423 |
| 6,056,846 | A * | 5/2000 | Kuhl ...................... | B29C 70/08 156/278 |
| 6,916,441 | B2 * | 7/2005 | Newell ............... | B29C 67/0085 264/340 |
| 8,178,033 | B2 * | 5/2012 | Dietrich ............. | B29C 33/3842 264/219 |
| 8,383,028 | B2 | 2/2013 | Lyons | |
| 9,415,539 | B2 * | 8/2016 | Benson, Jr. ......... | B29C 35/0266 |
| 9,523,919 | B2 * | 12/2016 | Benson, Jr. ......... | B29C 35/0888 |
| 9,625,814 | B2 * | 4/2017 | Katou .................. | G03F 7/0388 |
| 2004/0077745 | A1 * | 4/2004 | Xu ........................ | C08F 283/10 522/170 |

(Continued)

OTHER PUBLICATIONS

Objet, Ltd., "Thermal Treatment for Objet RGD525", dated as available online Oct. 25, 2011, pp. 1-3 (Year: 2011).*

*Primary Examiner* — Matthew J Daniels
*Assistant Examiner* — Andrew D Graham
(74) *Attorney, Agent, or Firm* — Coats & Bennett, PLLC

(57) ABSTRACT

Methods, systems and apparatuses are disclosed for making and post-processing a 3-D printed object for laminate-forming tooling, and components made using post-processed 3-D printed laminate-forming tooling.

11 Claims, 5 Drawing Sheets

(56) References Cited

U.S. PATENT DOCUMENTS

| | | | |
|---|---|---|---|
| 2005/0182233 A1* | 8/2005 | Weinhold | B29B 9/04 528/272 |
| 2006/0208388 A1* | 9/2006 | Bredt | B29C 67/0081 264/123 |
| 2007/0087198 A1* | 4/2007 | Dry | B29C 73/22 428/408 |
| 2007/0122748 A1* | 5/2007 | Bryant | G03F 7/0035 430/302 |
| 2008/0103226 A1* | 5/2008 | Xu | C08G 59/22 522/130 |
| 2009/0243159 A1* | 10/2009 | Sun | B29C 71/02 264/494 |
| 2010/0022678 A1* | 1/2010 | Yakimicki | A61L 27/16 522/161 |
| 2010/0025894 A1* | 2/2010 | Kleiner | B29C 71/0063 264/528 |
| 2010/0096072 A1* | 4/2010 | Hopkins | B29C 64/40 156/155 |
| 2010/0098927 A1* | 4/2010 | Boyd | B29C 70/44 428/220 |
| 2010/0190920 A1* | 7/2010 | Bellare | B29C 55/005 524/585 |
| 2010/0292374 A1* | 11/2010 | Bellare | B29C 47/0016 524/110 |
| 2011/0143110 A1* | 6/2011 | Tsuchiya | B29C 70/08 428/213 |
| 2011/0259515 A1* | 10/2011 | Rotter | B29C 70/382 156/285 |
| 2013/0196120 A1* | 8/2013 | Gray | B65D 61/00 428/174 |
| 2013/0245196 A1* | 9/2013 | Schwalm | C08G 18/755 524/591 |
| 2013/0327477 A1* | 12/2013 | Hollensteiner | B29C 70/446 156/245 |
| 2014/0110872 A1* | 4/2014 | Levy | B29C 67/0062 264/40.1 |
| 2014/0199524 A1* | 7/2014 | Rukavina | C08G 18/6644 428/174 |
| 2014/0272426 A1* | 9/2014 | Vu | B32B 27/08 428/423.3 |
| 2015/0044417 A1* | 2/2015 | Koike | B29C 59/022 428/137 |
| 2015/0123298 A1* | 5/2015 | Napadensky | B29C 41/48 264/1.7 |
| 2015/0145168 A1* | 5/2015 | Rodgers | B29C 67/0055 264/308 |
| 2015/0191620 A1* | 7/2015 | Beck | C09D 4/00 427/559 |
| 2015/0202829 A1* | 7/2015 | Toriyama | B29D 11/00769 428/162 |
| 2015/0266210 A1* | 9/2015 | Song | B29B 15/00 264/473 |
| 2015/0299941 A1* | 10/2015 | Lazzara | B29C 73/04 442/150 |
| 2016/0007482 A1* | 1/2016 | Schonholz | B32B 5/26 156/275.5 |
| 2016/0240003 A1* | 8/2016 | Frayne | B29C 67/0059 |
| 2016/0257066 A1* | 9/2016 | Atwood | B29C 71/04 |
| 2017/0100898 A1* | 4/2017 | Cofler | B29C 67/0092 |
| 2017/0113407 A1* | 4/2017 | Cox | B29C 67/0055 |
| 2017/0259488 A1* | 9/2017 | Napadensky | B29C 49/78 |

* cited by examiner

METHOD AND APPARATUS FOR HIGH-TEMPERATURE POST-CURING OF UV-CURED PHOTOPOLYMERS

TECHNOLOGICAL FIELD

The present disclosure relates generally to the field of laminate production. More specifically, the present disclosure relates to methods and apparatuses for producing non-metallic tooling for composite laminate production.

BACKGROUND

For the manufacture of composite parts and components, it is often required to manufacture layments (uncured laminated charges). The layments may comprise composite materials. Imparting desired shapes and dimensions to the layments requires positioning the layments onto various tools such as, for example, mandrels. Typically, mandrels and other tools for layments are made from metallic components. The tools are machined to exacting measurements and must not alter their dimension during the repeated laminate fabrication processes, which may include temperature and/or pressure cycling. Ideally, thermal characteristics of the tooling should be comparable to those of the composite parts being fabricated. In this way, substantially identical laminates are formed during laminate production. However, tools, especially tool surfaces, can become damaged, for example, during storage or transport. When a tool is damaged, it must be repaired or replaced. Due to the significant expense required to fabricate precision metallic tooling for laminate production, it is often impractical to maintain duplicate metallic tools. As a result, such repair or replacement often adversely impacts, and otherwise interrupts or delays, laminate production. An economical way to manufacture replacement tools for laminates, preferably on-site, would be particularly advantageous.

In addition, in the course of prototype development, the fabrication of parts in small run or singular run batches is required. Similarly, prototype part production of slightly varying dimension may be desired, but proves costly, as the tooling for such parts, such as laminates may require individual tooling for each part having a varied dimension. Until the final dimensions for parts in a prototype under development are achieved, such trial-and-error part production can significantly increase development cost, as expensive tooling must be developed to produce parts of varying dimension. In many cases of prototype production, the tooling (and the parts produced) may be used only for a small run, or perhaps even just once. An economical way to manufacture tooling for laminates during prototype manufacture, preferably on-site also would be particularly advantageous.

With the advent of 3-D printed part production technology, it is possible to produce "one-off" parts quickly and economically. However, the materials available to make 3-D fabricated parts are typically polymers that may not have the desired characteristics (in terms of density, hardness, thermal expansion, etc.) that may be required of the part during use. Once again, an economical way to manufacture tooling for laminates during prototype manufacture, preferably on-site, also would be particularly advantageous.

BRIEF SUMMARY

The present disclosure is directed to methods and apparatuses for providing post-processed 3-D printable precursors made from polymer-containing compounds that have particular use as tooling for the manufacture of composite layments.

According to further aspect, the present disclosure is directed to post-processing a 3-D printed object comprising preparing a 3-D printed object precursor made from a material comprising a polymer and a UV-curable additive, curing the precursor with UV radiation to obtain a UV-cured precursor, exposing the UV-cured precursor to a basic solution having a pH of from about 11 to about 14 for a predetermined amount of time, and exposing the UV-cured precursor to a predetermined post-UV curing regimen comprising progressively increasing the temperature from about room temperature to a temperature for a first predetermined amount of time, and progressively decreasing the temperature over a second predetermined amount time to obtain a product, and maintaining the UV-cured precursor in an inert environment during the post-UV curing regimen.

According to a further aspect, post-UV curing regimen progressively increases the temperature from about room temperature to from about 300 to about 400° F. In another aspect, after progressively increasing the temperature of the post-UV cure regimen from about room temperature to from about 300 to about 400° F., the post-UV curing regimen progressively decreases the temperature to room temperature.

According to further aspects, the post-UV curing regimen comprises predetermined temperature ramp rates and dwell periods during temperature increasing cycles and decreasing cycles. In one aspect, a predetermined temperature rate increase and decrease (ramp rate) is about 1° F./min.

In yet another aspect, the basic solution comprises sodium hydroxide.

In a still further aspect, the inert environment comprises nitrogen.

According to a further aspect, the present disclosure is directed to a UV-cured 3-D printed object that is post-UV-processed to produce a product according to the method of preparing a 3-D printed object precursor made from a material comprising a polymer and a UV-curable additive, curing the precursor with UV radiation to obtain a UV-cured precursor, exposing the UV-cured precursor to a basic solution having a pH of from about 11 to about 14 for a predetermined amount of time, and exposing the UV-cured precursor to a predetermined post-UV curing regimen comprising progressively increasing the temperature from about room temperature to a predetermined temperature for a first predetermined amount of time, and progressively decreasing the temperature over a second predetermined amount time to obtain a product, and maintaining the UV-cured precursor in an inert environment during the post-UV curing regimen.

According to a further aspect, post-UV curing processing progressively increases the temperature of a UV-cured precursor from about room temperature to from about 300 to about 400° F. In another aspect, at a predetermined time after progressively increasing the temperature of a UV-cured precursor from about 300 to about 400° F., the post-UV curing regimen progressively decreases the temperature to room temperature.

According to further aspects, the post-UV curing processing comprises predetermined temperature ramp rates and predetermined dwell periods during temperature increasing cycles and decreasing cycles. In one aspect, a predetermined temperature rate increase and decrease (ramp rate) is about 1° F./min.

In another aspect, the product is a laminate-forming tool, such as, for example, a mandrel.

In yet another aspect, the product is a high temperature photopolymer.

Still further aspects of the present disclosure are directed to a vehicle comprising a component that comprises a composite material. The composite material comprises a laminate, wherein the laminate is made by forming the laminate using a tool comprising a product made from a post-processed 3D printed product made by first preparing a 3-D printed object precursor made from a material comprising a polymer and a UV-curable additive, curing the precursor with UV radiation to obtain a UV-cured precursor, exposing the UV-cured precursor to a basic solution having a pH of from at about 11 to about 14 for a predetermined amount of time, and exposing the UV-cured precursor to a predetermined post-UV curing regimen comprising progressively increasing the temperature from about room temperature to a predetermined temperature for a first predetermined amount of time, and progressively decreasing the temperature over a second predetermined time to obtain a product, and maintaining the UV-cured precursor in an inert environment during the post-UV curing regimen.

According to a further aspect, laminates used as components in vehicles are manufactured using tooling made from UV-cured precursor material that is subjected to a post-UV-curing regimen that progressively increases the temperature of a UV-cured precursor from about room temperature to from about 300 to about 400° F. over a first predetermined time. In another aspect, at a predetermined time after progressively increasing the temperature of a UV-cured precursor from about 300 to about 400° F., the post-UV curing regimen progressively decreases the temperature to room temperature over a second predetermined.

According to further aspects, the post-UV curing processing of the UV-cured precursor material comprises predetermined temperature ramp rates and predetermined dwell periods during temperature increasing cycles and decreasing cycles. In one aspect, a predetermined temperature rate increase and decrease (ramp rate) is about 1° F./min.

According to further aspects, the vehicle may be a manned vehicle or an unmanned vehicle and may be selected from vehicles including aircraft, spacecraft, satellites, rockets, missiles, etc. and therefore include manned and unmanned aircraft, spacecraft, terrestrial, non-terrestrial, and even surface and sub-surface water-borne vehicles and objects.

BRIEF DESCRIPTION OF THE DRAWINGS

Figure 1:
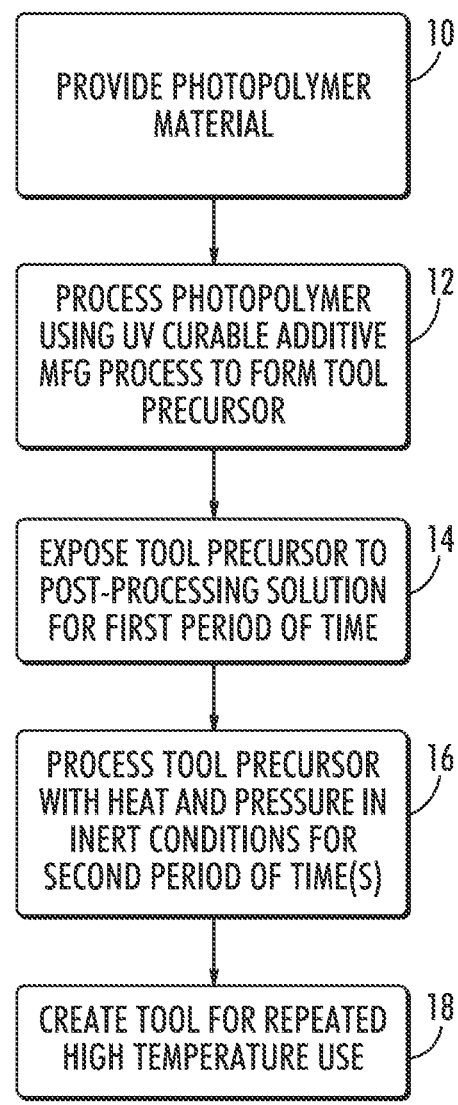
Figure 2:
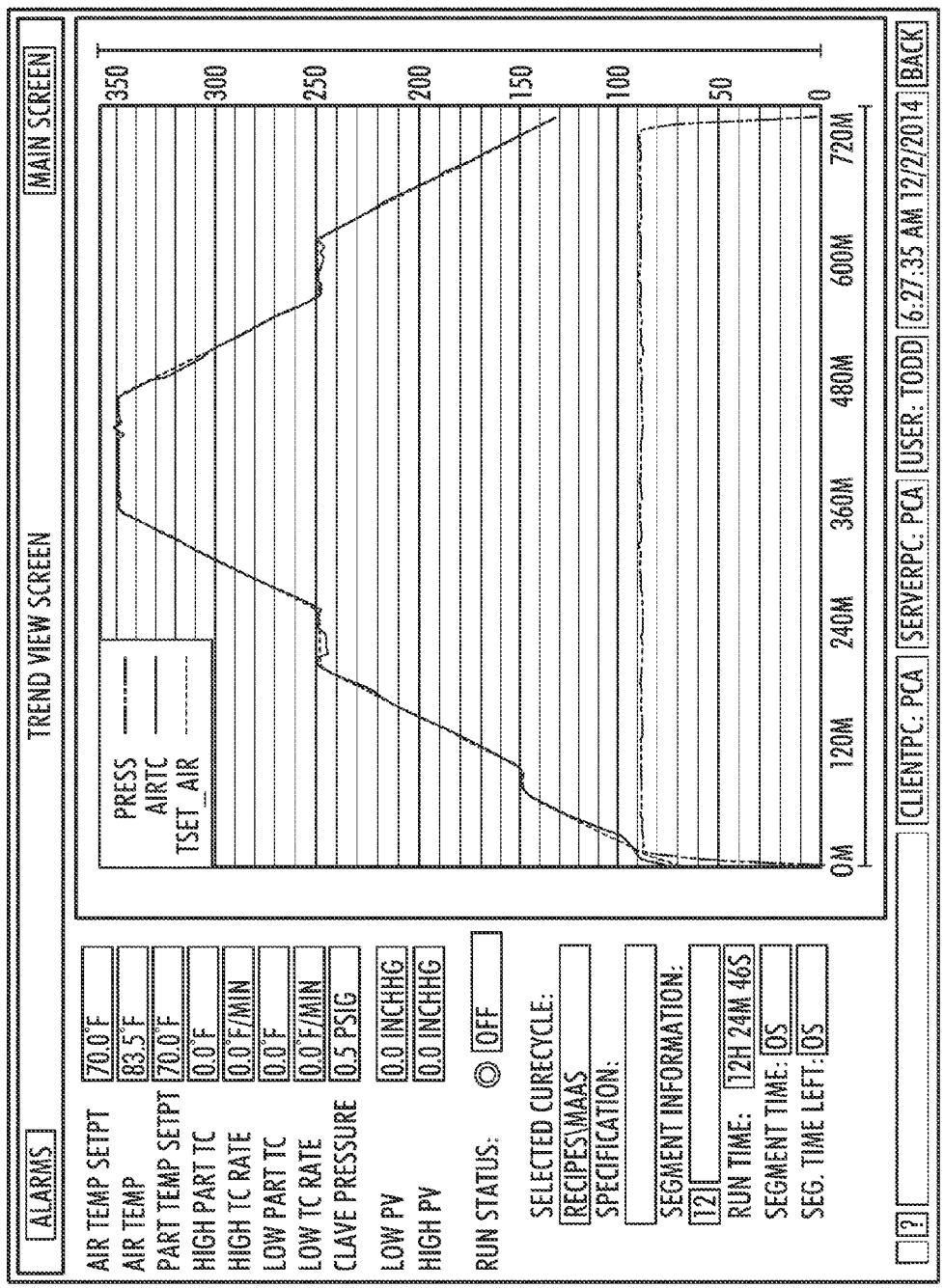
Figure 3:
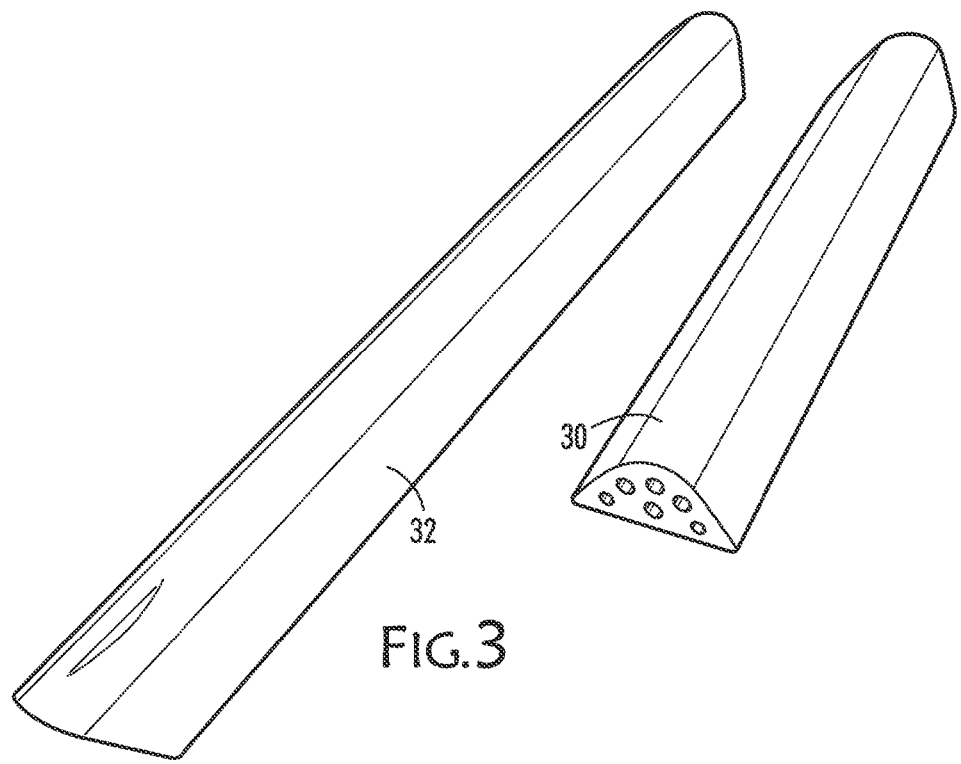
Figure 4:
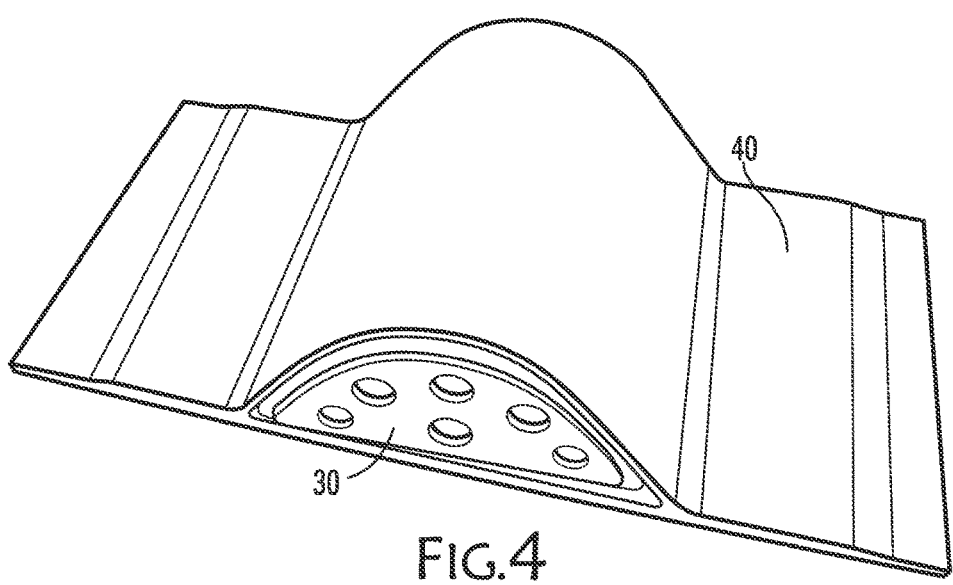

Having thus described variations of the disclosure in general terms, reference will now be made to the accompanying drawings, which are not necessarily drawn to scale, and wherein:

FIG. 1 is a flow chart outlining one aspect of the present disclosure;

FIG. 2 is a graph showing, in one aspect, a post-UV-curing heating regimen;

FIG. 3 is a side view of a lay-up mandrel for forming a laminate;

FIG. 4 is a side view of a laminate section layed-up upon a lay-up mandrel; and

Figure 5:
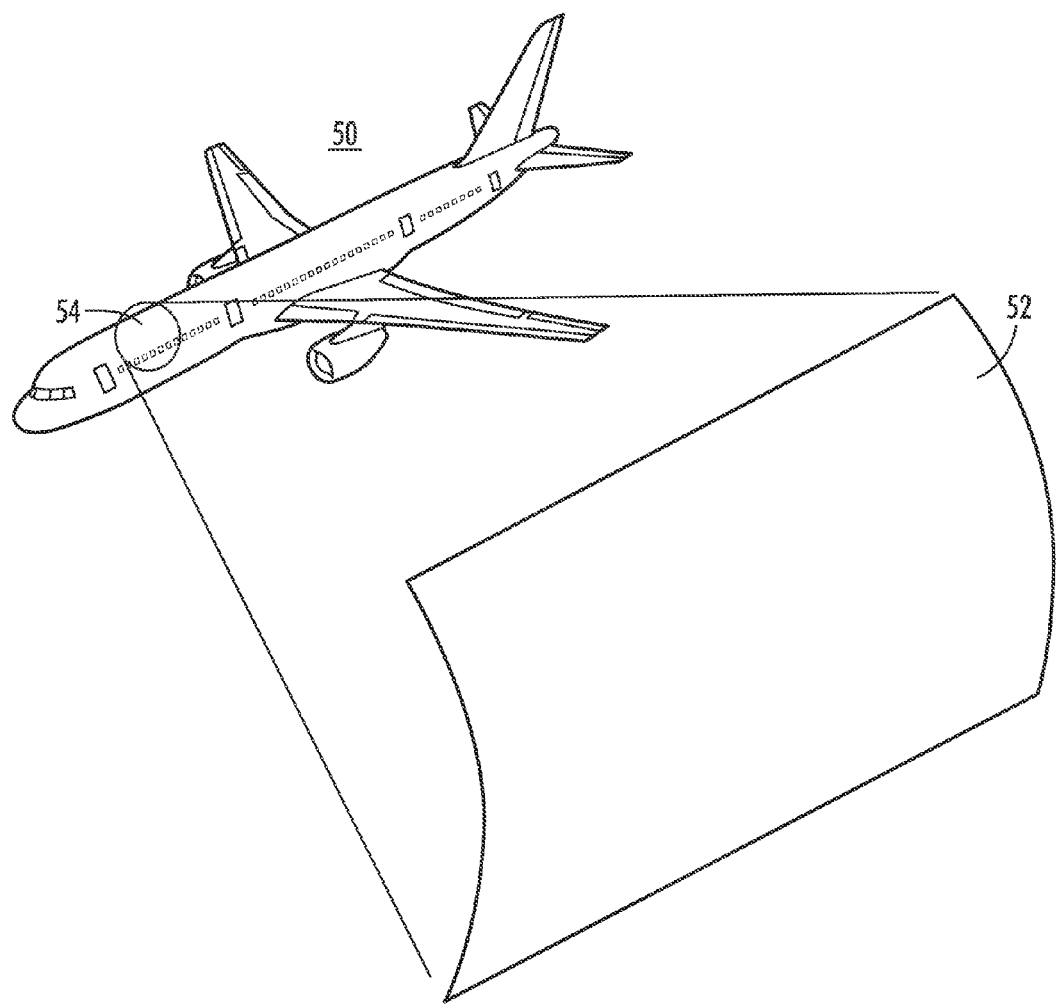
Figure 6:
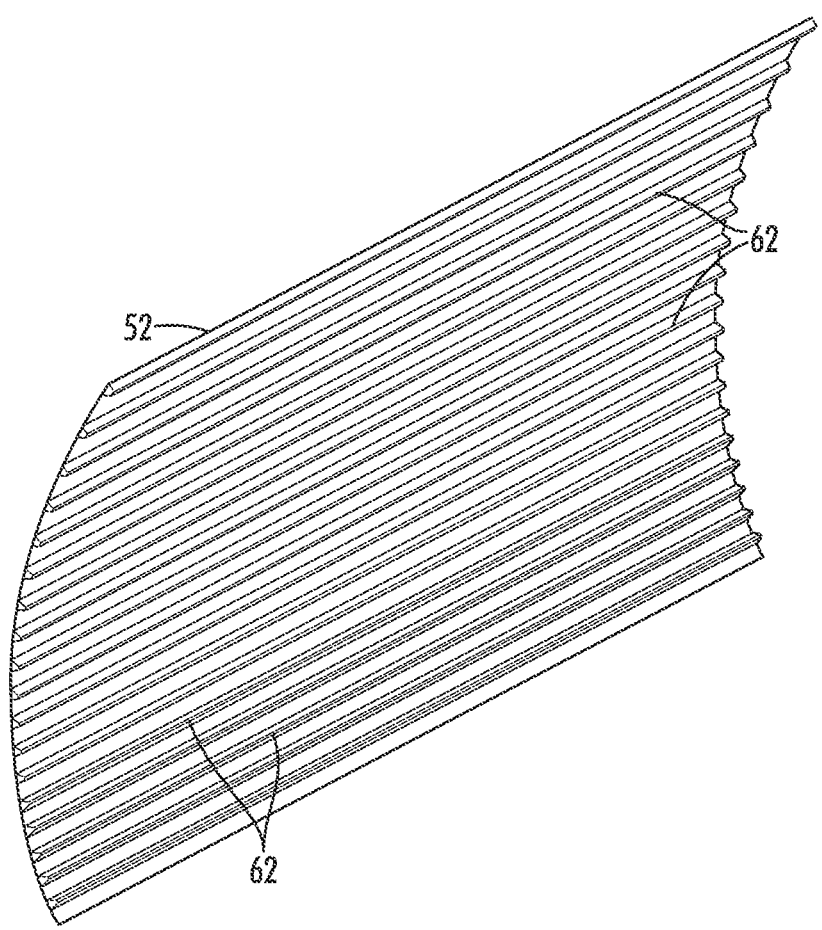

FIGS. 5 and 6 are diagrams of an aircraft comprising component parts made using tools according to aspects disclosed herein.

DETAILED DESCRIPTION

FIG. 1 shows a flow chart diagram according to one aspect of the present disclosure. A photopolymer material 10 is provided as a starting material. The photopolymer may be selected from a group including acrylics, urethanes, acrylates, epoxy acrylates, etc. Other suitable materials may be used so long as they may be processed through a 3-D printing apparatus as would be readily understood by one skilled in the field. According to step 12, the photopolymer material 10 is introduced to a 3-D printer apparatus, such as, for example, an Objet Connex 500® (Stratasys, Rehovat, Israel), or any similar 3D printing apparatus, as would be understood by those skilled in the field. A photopolymer mix may comprise a UV-curable component. The photopolymer mix is then supplied to the 3-D printer as would be readily understood by those skilled in the field. Alternatively, a photopolymer and a UV-curable additive may be supplied separately to the 3-D printer, as would also be readily understood. An object is then prepared according to readily understood 3-D printing protocols. For the purposes of this application, the 3-D printed object is considered to be a tool precursor. According to accepted 3-D manufacturing protocols, a 3-D manufactured part is often fabricated upon/or along with a support made from a support material. 3-D printers typically comprises multiple heads and multiple photopolymer cartridges. The software associated with the 3-D printer determines where support material is to be deposited to support the rest of the "tool precursor" structure. Such deposited support material prevents the printed tool precursor from sagging, warping, etc. This support material is typically a photopolymer containing hygroscopic compounds allowing the support material to swell/dissolve in the presence of solvents, such as, for example, water, propylene glycol, polyethylene glycol, glycerin and combinations thereof. This support is typically trimmed away from the 3-D fabricated part. In addition, extraneous and unwanted material may become attached to the 3-D fabricated part during the 3-D manufacturing process. According to aspects of the present disclosure, some amount of the support material diffuses/fuses into the surface layer of the "tool precursor". The basic solution reacts with this surface layer and "draws out" and otherwise removes the support material.

It is to be understood that the tool precursor has structural integrity (i.e. is suitably hardened to achieve dimensional stability), but is not yet suitable to withstand the thermal/pressure cycling that is required of a finished tool. In step 14, the 3-D printed tool precursor is exposed to a post-processing solution to remove any unwanted material present on the tool precursor (i.e. unwanted material remaining on the tool precursor that is co-formed during the 3-D processing). The post-processing solution is a basic solution having a pH of from about 11 to about 14. Preferred post-processing solutions include sodium hydroxide and sodium hydroxide-containing solutions having a pH of from about 11 to about 14. The tool precursor is removed from the post-processing solution after a predetermined period of time, and after substantially all of the unwanted material present on the tool precursor has been removed from the tool precursor. It is understood that an amount of physical debris removal from the 3-D manufactured tool precursor may also occur during the post-processing 14. In step 16, the tool precursor is further processed by exposing the precursor to a predetermined heating regimen in an inert environment substantially maintained at a pressure of from at least about 90 psi. It is understood that pressures above 90 psi may be employed and maintained. The inert environment may comprise any noble gas, such as, for example, argon, nitrogen or combinations thereof, with a nitrogen environment being particularly preferred. The heating apparatus may be any apparatus that provides a controllable and varying amount of heat. One particularly preferred device is an autoclave. The tool precursor is post-cured at progressively increasing temperatures of from ambient, or room temperature up to a maximum regimen temperature of from about 300° F. to about 400° F. The progressive temperature increase is regulated according to preferred protocols set forth below in the Example section of the present specification. The temperature processing may include multiple temperature heating ramps and hold cycles (dwell periods). Following the temperature processing of step 16, the processed precursor is allowed to cool to ambient temperature, and brought to ambient pressure, and a finished product (tool) 18 has been produced.

FIG. 2 is a graph showing a curing/heating regimen for post-curing a 3-D printed photopolymer precursor. The sample was heated up to 150° F. at a rate of 1° F./min. and left to dwell for 30 min., then heated to 250° F. and left to dwell for 60 min., followed by heating to 350° F. and a dwell period of 120 min. Temperatures were then decreased at a rate of 1° F./min. to 250° F. with a dwell period of 60 min. followed by a temperature decrease to ambient. A pressure environment of 90 psi was maintained throughout. It is understood that alternate dwell periods, pressures in excess of 90 psi, and temperatures may be observed. It is believed that maximum temperatures should approximate the temperatures at which the 3-D photopolymer cures, making additional/alternate temperature/pressure combinations possible.

FIG. 3 shows post-cured products or tools 30 made by using a photopolymer and 3-D printing according to methods disclosed herein. The product is in the form of a layup mandrel used in the fabrication of aircraft components. Such components can include the processing of layed-up composite laminates, such as, for example, composite laminates used in the manufacture of various aircraft components. As stated above, typically, mandrels and other tools for layments are made from metallic components. The tools are machined to exacting external and internal geometries and measurements, and must not alter their dimension during the repeated laminate fabrication processes, which may include temperature and/or pressure cycling. Ideally, thermal characteristics of the tooling should be comparable to those of the composite parts being fabricated. In this way, substantially identical laminates are formed during laminate production. However, tools, especially tool surfaces, can become damaged, for example, during storage or transport. When a tool is damaged, it must be repaired or replaced. Due to the significant expense required to fabricate precision metallic tooling for laminate production, it is often impractical to maintain duplicate metallic tools. As a result, such repair or replacement often adversely impacts, and otherwise interrupts or delays, laminate production. Aspects of the present disclosure provide an efficient and cost-effective way to more quickly manufacture replacement tools for laminate production, preferably on-site.

With the advent of 3-D printed part production technology, it is possible to produce "one-off" parts quickly and economically. However, the materials available to make 3-D fabricated parts are typically polymers that may not have the desired characteristics (in terms of density, hardness, thermal expansion, etc.) that may be required of the part during use. Once again, an economical way to manufacture tooling for laminates during prototype manufacture, preferably on-site, also would be particularly advantageous.

FIG. 4 shows a layed-up composite laminate 40 that has been dimensioned according to known procedures by being brought into contact under pressure with the tool 30 that has been post-cured according to methods disclosed herein.

EXAMPLE

According to one preferred protocol, a 3-D printed tool precursor was made from a UV-cured photopolymer Objet RGD525 supplied to an Objet Connex 500® 3-D printer. (Stratasys, Rehovat, Israel). A tool precursor having a predetermined dimension was 3-D printed according to suggested set-up and operation. The 3-D printed tool precursor was then cleaned to remove support material via physical scraping, followed by soaking the tool precursor in a sodium hydroxide solution having a pH of about 11 for 60 minutes. The sodium hydroxide solution was maintained at a temperature of from about 120° F. to about 150° F. The tool precursor was removed from the cleaning solution and allowed to cool to room temperature. The tool precursor was then subjected to the following temperature processing regimen. The precursor was loaded into an autoclave (United McGill Corporation, Columbus, Ohio). The ambient air in the autoclave was purged and replaced and maintained with a nitrogen environment. The temperature inside the autoclave was increased from room temperature at a rate of about 1° F. per minute up to about 150° F. The precursor was then subjected to a first dwell period of 30 minutes at 150° F., followed by an increase in temperature at a rate of about 1° F. per minute up to about 250° F. The precursor was then subjected to a second dwell period at 250° F. for 60 minutes, followed by increasing the temperature at a rate of about 1° F. per minute up to a temperature of about 350° F. The precursor was next subjected to a third dwell period of about 120 minutes at 350° F. The temperature was then decreased at a rate of about 1° F. per minute until the temperature reached about 250° F. At this stage, the precursor was subjected to a dwell period of 60 minutes at 250° F. The temperature was then decreased at a rate of about 1° F. per minute to room temperature. FIG. 2 is a graph depicting a heating regimen as described above. As stated above, it is understood that alternate dwell periods, pressures in excess of 90 psi, and temperatures may be observed. It is believed that maximum temperatures should approximate the temperatures at which the 3-D photopolymer cures, making additional/alternate temperature/pressure combinations possible.

Referring more particularly to the drawings, embodiments of the disclosure may be described in the context of an aircraft manufacturing and service methods. FIG. 5 shows a vehicle, particularly an aircraft 50 may comprise components, such as, for example, stringers, fuselage panels, etc. that are produced by methods disclosed herein using the post-cured polymeric tooling disclosed herein, and may include component parts used to fabricate an airframe or any component parts used in connection with the manufacture of an interior or an exterior, or any structural component for an aircraft. FIG. 5, shows aircraft 50 having section 52 enlarged to show fuselage panel 54 comprising components (not shown) made according to aspects of the present disclosure. FIG. 6 shows the interior side of enlarged section 52, showing fuselage stringers 62 in place, said stringers 62 made from the tooling and according to aspects of the present disclosure.

Although an aerospace example (aircraft) is shown, the principles of aspect of the present disclosure may be applied to other vehicles and vehicle industries, such as the automotive industry. For example, components or sub-assemblies may be fabricated or manufactured using the post-cured polymeric tooling and methods disclosed herein.

Although the preferred variations and alternatives of the present disclosure have predominantly been discussed relative to the manufacture and use of laminates and other parts, the present disclosure is also useful relative to the manufacture and use of such laminates and parts in the fabrication of larger parts and structures. Such devices include, but are not limited to, parts designed to be positioned on the exterior or interior of atmospheric and aerospace vehicles and other objects, and structures designed for use in space or other upper-atmosphere environments, such as, for example manned or unmanned vehicles and objects. Contemplated objects include, but are not limited to vehicles, such as, for example, aircraft, spacecraft, satellites, rockets, missiles, etc. and therefore include manned and unmanned aircraft, spacecraft, terrestrial, non-terrestrial, and even surface and sub-surface water-borne vehicles and objects.

While the preferred variations and alternatives of the present disclosure have been illustrated and described, it will be appreciated that various changes and substitutions can be made regarding the readable element, methods for its implantation in the laminate, and the apparatuses used to effect the implantation, scanning and detection methods therein without departing from the spirit and scope of the disclosure. Accordingly, the scope of the disclosure should only be limited by the accompanying claims and equivalents thereof.

What is claimed is:

1. A method comprising the steps of:
    preparing a 3-D printed tool precursor made from a material comprising a polymer and a UV-curable additive;
    curing the 3-D printed tool precursor with UV radiation to obtain a 3-D printed UV-cured tool precursor;
    exposing the 3-D printed UV-cured tool precursor to a basic solution having a pH of from about 11 to about 14 for a predetermined amount of time; and
    exposing the 3-D printed UV-cured tool precursor to a predetermined post-UV-curing regimen, said post-UV-curing regimen maintained at a pressure of 90 psi, and said post-UV-curing regimen comprising progressively increasing a temperature at a ramp rate of 1° F./min. from about room temperature to a predetermined maximum temperature from about 300° F. to about 400° F., with predetermined dwell periods during temperature increases, and progressively decreasing the temperature at a rate of 1° F./min from the predetermined maximum temperature to a temperature of 250° F. followed by a dwell period of 60 mins., followed by a temperature decrease from 250° F. to room temperature to obtain a 3-D printed finished tool for the manufacture of a composite layment.

2. The method of claim 1, wherein the basic solution comprises sodium hydroxide.

3. The method of claim 1, further comprising the step of maintaining the 3-D printed UV-cured tool precursor in an inert environment during the post-UV-curing regimen, wherein the inert environment comprises a gas selected from the group consisting of: argon, nitrogen and combinations thereof.

4. The method of claim 1, wherein, in the step of preparing a 3-D printed tool precursor made from a material comprising a polymer and a UV-curable additive, the polymer comprises photopolymer.

5. The method of claim 3, wherein the inert environment is maintained at a pressure of at least about 90 psi during the predetermined heating regimen.

6. The method of claim 3, wherein the inert environment comprises nitrogen.

7. The method of claim 1, wherein, in the step of exposing the 3-D printed UV-cured tool precursor to a predetermined post-UV-curing regimen, further comprising:
    exposing the 3-D printed UV-cured tool precursor to a predetermined post-UV-curing regimen, said subsequent post-UV-curing regimen regimen maintained at a pressure of 90 psi, and said post-UV-curing regimen comprising increasing a temperature at a ramp rate of 1° F./min. from about room temperature to a temperature of 150° F. followed by a dwell period of 30 mins. at 150° F., followed by increasing a temperature at a ramp rate of 1° F./min. heating from 150° F. to 250° F. followed by a dwell period of 60 mins at 250° F., followed by increasing a temperature at a ramp rate of 1° F./min. from 250° F. to 350° F. followed by a dwell period of 120 mins at 350° F., and decreasing the temperature at a rate of 1° F./min. from 350° F. to 250° F. followed by a dwell period of 60 mins., followed by further decreasing the temperature at a rate of about 1° F./min. from 250° F. to room temperature to obtain a 3-D printed finished tool for the manufacture of a composite layment.

8. The method of claim 1, wherein, in the step exposing the 3-D printed UV-cured tool precursor to a basic solution, the basic solution is maintained at a temperature of from about 120° F. to about 150° F.

9. The method of claim 8, wherein, after the step of exposing the 3-D printed UV-cured tool precursor to a basic solution, the basic solution maintained at a temperature of from about 120° F. to about 150° F., further comprising the step of:
    allowing the basic solution to cool to room temperature.

10. The method of claim 7, wherein the inert environment comprises nitrogen.

11. The method of claim 7, wherein, in the step exposing the 3-D printed UV-cured tool precursor to a basic solution, the basic solution is maintained at a temperature of from about 120° F. to about 150° F.

* * * * *